United States Patent
Evstatieva et al.

(10) Patent No.: US 8,003,716 B2
(45) Date of Patent: Aug. 23, 2011

(54) AQUEOUS POLYMER DISPERSIONS BASED ON COPOLYMERS FORMED FROM VINYLAROMATICS AND CONJUGATED ALIPHATIC DIENES, PROCESSES FOR PREPARATION THEREOF AND USE THEREOF

(75) Inventors: Elitsa Evstatieva, Mannheim (DE); Juergen Schmidt-Thuemmes, Neuhofen (DE); Dirk Lawrenz, Hassloch (DE); Johannes Jan-Bessel Minderhoud, Schifferstadt (DE); Guillermo Arens, Frankenthal (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/679,678

(22) PCT Filed: Oct. 6, 2008

(86) PCT No.: PCT/EP2008/063353
§ 371 (c)(1),
(2), (4) Date: Mar. 24, 2010

(87) PCT Pub. No.: WO2009/047233
PCT Pub. Date: Apr. 16, 2009

(65) Prior Publication Data
US 2010/0204382 A1 Aug. 12, 2010

(30) Foreign Application Priority Data
Oct. 8, 2007 (EP) .................................. 07118037

(51) Int. Cl.
*C08F 251/02* (2006.01)
*C08F 2/22* (2006.01)
*C08L 51/02* (2006.01)

(52) U.S. Cl. ....... 524/52; 526/213; 526/227; 526/317.1; 526/318.6

(58) Field of Classification Search .................... 524/52; 526/213, 227, 317.1, 318.6
See application file for complete search history.

(56) References Cited

U.S. PATENT DOCUMENTS

| 5,147,907 A * | 9/1992 | Rinck et al. ...................... 524/48 |
| 2005/0176878 A1 | 8/2005 | Ettl et al. |
| 2005/0176978 A1 * | 8/2005 | Verkade et al. ............... 554/174 |

FOREIGN PATENT DOCUMENTS

| EP | 0 408 099 | 1/1991 |
| EP | 0 536 597 | 4/1993 |
| JP | 06248031 | 9/1994 |
| WO | 99 09251 | 2/1999 |
| WO | 03 091300 | 11/2003 |

* cited by examiner

Primary Examiner — Kelechi C Egwim
(74) *Attorney, Agent, or Firm* — Oblon, Spivak, McClelland, Maier & Neustadt, L.L.P.

(57) ABSTRACT

Aqueous polymer dispersions based on copolymers of vinyl aromatics and conjugated aliphatic dienes having a mean particle size of from 80 to 150 nm, obtained by free radical emulsion copolymerization of
(a) from 19.9 to 80 parts by weight of at least one vinyl aromatic compound,
(b) from 19.9 to 80 parts by weight of at least one conjugated aliphatic diene,
(c) from 0.1 to 10 parts by weight of at least one ethylenically unsaturated acid, and
(d) from 0 to 20 parts by weight of at least one other monoethylenically Unsaturated monomer,
the sum of the parts by weight of the monomers (a), (b), (c) and (d) always being 100, in an aqueous medium in the presence of at least one degraded starch having an intrinsic viscosity $\eta_i$ of less than 0.07 dl/g with the use of at least 0.9% by weight, based on the monomers used altogether, of initiators selected from peroxodisulfates, peroxosulfates, azo initiators, organic peroxides, organic hydroperoxides and hydrogen peroxide, at least 30% by weight of the initiators being initially taken together with the degraded starch in the aqueous medium and the monomers and the remaining initiators being metered into this initially taken mixture under polymerization conditions.

18 Claims, No Drawings

AQUEOUS POLYMER DISPERSIONS BASED ON COPOLYMERS FORMED FROM VINYLAROMATICS AND CONJUGATED ALIPHATIC DIENES, PROCESSES FOR PREPARATION THEREOF AND USE THEREOF

The invention relates to aqueous polymer dispersions based on copolymers of vinyl aromatics and conjugated aliphatic dienes, processes for their preparation and their use as binders for paper coating slips, adhesives, sizes for fibers and for the production of coverings.

EP-A 0 536 597 discloses aqueous polymer dispersions which are obtainable by free radical emulsion polymerization of unsaturated monomers in the presence of at least one starch degradation product which is prepared by hydrolysis of native starch or chemically modified starch in an aqueous phase and has a weight average molecular weight $M_w$ of from 2500 to 25 000. Unsaturated monomers used are, for example, monomer mixtures which comprise from 50 to 100% by weight of esters of acrylic acid and/or methacrylic acid with alcohols having 1 to 12 carbon atoms and/or styrene or from 70 to 100% by weight of styrene and/or butadiene.

As is evident from the data in table 3 of the application, the dispersed polymer particles have a mean particle size of 407, 310 and 209 nm, respectively. The polymer dispersions are used as a binder, adhesive, size for fibers of for the production of coverings. Paper coating slips which comprise these dispersions as binders show inadequate running behavior when they are used on high-speed machines.

WO 99/09251 discloses a starch-copolymer product and a process for its preparation. The starch-copolymer product is to be considered as a reaction product of starch with at least one monomer which is capable of undergoing free radical polymerization. It has a mean particle size of less than 180 nm. In order to prepare aqueous dispersions of such products, an aqueous solution or dispersion of a degraded starch which has an intrinsic viscosity η of from 0.07 to 0.35 dl/g in aqueous solution and at a temperature of 25° C. is used. The polymerization is carried out in such a way that first part of the monomers and of the free radical initiator is added to the aqueous solution or dispersion of the degraded starch which has been heated to polymerization temperature, and, after the polymerization starts, further portions of monomers and initiator are metered, at least 75% of the total monomers being added more than one hour after initiation of the polymerization. The dispersions are used for the production of coverings and as binders for paper products. However, the binding power of such products is not sufficient.

WO 03/091300 discloses aqueous polymer dispersions which are obtainable by free radical copolymerization of (a) from 0.1 to 99.9% by weight of styrene and/or methylstyrene, (b) from 0.1 to 99.9% by weight of 1,3-butadiene and/or isoprene and (c) from 0 to 40% by weight of other ethylenically unsaturated monomers, the sum of the monomers (a), (b) and (c) always being 100, in the presence of from 10 to 40% by weight, based on the monomers used, of at least one degraded starch having a molecular weight $M_n$ of from 500 to 40 000 and of water-soluble redox catalysts. These polymer dispersions are used as engine and surface sizes for paper, board and cardboard. Since they have a poor binding power, they are not suitable, for example, as binders in paper coating slips.

It was the object of the invention to provide further aqueous polymer dispersions based on copolymers of vinyl aromatics and conjugated aliphatic dienes, which copolymers are prepared in the presence of degraded starch, whereby the dispersions should ensure a higher binding power compared with the known products and good running behavior on high-speed machines when used in paper coating slips. The aqueous polymer dispersions should also comprise virtually no coagulant.

The object is achieved, according to the invention, by aqueous polymer dispersions based on copolymers of vinyl aromatics and conjugated aliphatic dienes, if said polymer dispersions have a mean particle size of from 80 to 150 nm and are obtainable by free radical emulsion copolymerization of (a) from 19.9 to 80 parts by weight of at least one vinyl aromatic compound, (b) from 19.9 to 80 parts by weight of at least one conjugated aliphatic diene, (c) from 0.1 to 10 parts by weight of at least one ethylenically unsaturated acid and (d) from 0 to 20 parts by weight of at least one other monoethylenically unsaturated monomer, the sum of the parts by weight of the monomers (a), (b), (c) and (d) always being 100, in an aqueous medium in the presence of at least one degraded starch having an intrinsic viscosity $\eta_i$ of less than 0.07 dl/g with the use of at least 0.9% by weight, based on the monomers used altogether, of initiators selected from peroxodisulfates, peroxosulfates, azo initiators, organic peroxides, organic hydroperoxides and hydrogen peroxide, at least 30% by weight of the initiators being initially taken together with the degraded starch in the aqueous medium and the monomers and the remaining initiators being metered into this initially taken mixture under polymerization conditions. Preferred aqueous polymer dispersions are obtainable if from 3 to 10% by weight of the monomers copolymerized altogether are initially taken in the aqueous medium in the free radical emulsion copolymerization and/or a degraded native starch having an intrinsic viscosity $\eta_i$ of from 0.02 to 0.06 dl/g is used in the emulsion copolymerization.

The aqueous polymer dispersions are obtainable, for example, by using monomer mixtures comprising (a) from 19.9 to 80 parts by weight of styrene and/or methylstyrene, (b) from 19.9 to 80 parts by weight of 1,3-butadiene and/or isoprene, (c) from 0.1 to 10 parts by weight of at least one ethylenically unsaturated acid and (d) from 0 to 20 parts by weight of at least one other monoethylenically unsaturated monomer, the sum of the parts by weight of monomers (a), (b), (c) and (d) always being 100, in the emulsion copolymerization. Preferred aqueous polymer dispersions are obtainable if (a) from 25 to 70 parts by weight of styrene and/or methylstyrene, (b) from 25 to 70 parts by weight of 1,3-butadiene and/or isoprene, (c) from 0.1 to 10 parts by weight of at least one ethylenically unsaturated acid and (d) from 0 to 20 parts by weight of at least one other monoethylenically unsaturated monomer, the sum of the parts by weight of the monomers (a), (b), (c) and (d) always being 100, are used in the emulsion copolymerization.

For example, from 15 to 60 parts by weight of a degraded starch are used per 100 parts by weight of the monomers in the emulsion copolymerization.

Suitable monomers of group (a) are vinyl aromatic compounds, e.g. styrene, α-methylstyrene and/or vinyltoluene.

From this group of monomers, styrene is preferably used. 100 parts by weight of the monomer mixtures used altogether in the polymerization comprise, for example, from 19.9 to 80 parts by weight and preferably from 25 to 70 parts by weight of at least one monomer of group (a).

Monomers of group (b) are, for example, 1,3-butadiene, isoprene, 1,3-pentadiene, dimethyl-1,3-butadiene and cyclopentadiene. From this group of monomers, 1,3-butadiene and/or isoprene are preferably used. 100 parts by weight of the monomer mixtures which are used altogether in the emulsion polymerization comprise, for example, from 19.9 to 80 parts by weight, preferably from 25 to 70 parts by weight and in particular from 25 to 60 parts by weight of at least one monomer of group (b).

Monomers of group (c) are, for example, ethylenically unsaturated carboxylic acids, ethylenically unsaturated sulfonic acids and vinylphosphonic acid. Ethylenically unsaturated carboxylic acids used are preferably α,β-monoethylenically unsaturated mono- and dicarboxylic acids having 3 to 6 carbon atoms in the molecule. Examples of these are acrylic acid, methacrylic acid, maleic acid, fumaric acid, crotonic acid, vinylacetic acid and vinyllactic acid. Suitable ethylenically unsaturated sulfonic acids are, for example, vinylsulfonic acid, styrenesulfonic acid, acrylamidomethylpropanesulfonic acid, sulfopropyl acrylate and sulfopropyl methacrylate.

The monomers of group (c) which comprise acid groups can be used in the polymerization in the form of the free acids and in the form partly or completely neutralized with alkalis or with ammonia or with an ammonium base. Sodium hydroxide solution, potassium hydroxide solution or ammonia is preferably used as the neutralizing agent. 100 parts by weight of the monomer mixtures which are used in the emulsion polymerization comprise, for example, from 0.1 to 10 parts by weight, preferably from 0.1 to 8 parts by weight and in general from 1 to 5 parts by weight of at least one monomer of group (c).

Suitable monomers of group (d) are other monoethylenically unsaturated compounds. Examples of these are ethylenically unsaturated carbonitriles, such as, in particular, acrylonitrile and methacrylonitrile, ethylenically unsaturated carboxamides, such as, in particular acrylamide and methacrylamide, vinyl esters of saturated $C_1$- to $C_{18}$-carboxylic acids, preferably vinyl acetate, and esters of acrylic acid and of methacrylic acid with monohydric $C_1$- to $C_{18}$-alcohols, such as methyl acrylate, methyl methacrylate, ethyl acrylate, ethyl methacrylate, n-propyl acrylate, n-propyl methacrylate, isopropyl acrylate, isopropyl methacrylate, n-butyl acrylate, n-butyl methacrylate, isobutyl acrylate, isobutyl methacrylate, sec-butyl acrylate, sec-butyl methacrylate, tert-butyl acrylate, tert-butyl methacrylate, pentyl acrylates, pentyl methacrylates, 2-ethylhexyl acrylate, 2-ethylhexyl methacrylate, allyl esters of saturated carboxylic acids, vinyl ethers, vinyl ketones, dialkyl esters of ethylenically unsaturated carboxylic acids, N-vinylpyrrolidone, N-vinylpyrrolidine, N-vinylformamide, N,N-dialkylaminoalkylacrylamides, N,N-dialkylaminoalkylmethacrylamides, N,N-dialkylaminoalkyl acrylates, N,N-dialkylaminoalkyl methacrylates, vinyl chloride and vinylidene chloride. This group of monomers is used, if appropriate, for modifying the polymers. 100 parts by weight of the monomer mixtures used in the emulsion polymerization comprise, for example, from 0 to 20 parts by weight, in general from 0 to 15 parts by weight and in particular from 0 to 10 parts by weight of at least one monomer of group (d).

In the emulsion copolymerization, for example, from 15 to 60 parts by weight of a degraded starch are used per 100 parts by weight of monomers. All the native starches, such as starches from corn, wheat, oats, barley, rice, millet, potatoes, peas, tapioca, sorghum or sago, are suitable as starting starches for the preparation of the degraded starches to be used according to the invention. Also of interest are those natural starches which have a high amylopectin content, such as waxy corn starch and waxy potato starch. The amylopectin content of these starches is above 90%, in general from 95 to 100%. Starches modified chemically by etherification or esterification can also be used for the preparation of the polymer dispersions according to the invention. Such products are known and are commercially available. They are prepared, for example, by esterification of native starch or degraded native starch with inorganic or organic acids, their anhydrides or chlorides. Of particular interest are phosphated and acetylated degraded starches. The most commonly used method for the etherification of starches consists in the treatment of starch with organic halogen compounds, epoxides or sulfates in aqueous alkaline solution. Known starch ethers are alkyl ethers, hydroxyalkyl ethers, carboxyalkyl ethers and allyl ethers. The reaction products of starches with 2,3-epoxypropyltrimethylammonium chloride are also suitable. Degraded native starches are particularly preferred, in particular native starches degraded to maltodextrin.

The degradation of the starches can be effected enzymatically, oxidatively or hydrolytically by the action of acids or bases. Degraded starches are commercially available. However, a natural starch can, for example, also first be degraded enzymatically in an aqueous medium and, after stopping of the enzymatic degradation, the emulsion polymerization of the monomers can be carried out according to the invention in the resulting aqueous solution or dispersion of the degraded starch. The degraded starches have, for example, an intrinsic viscosity $\eta_i$ of <0.07 dl/g, preferably <0.05 dl/g. The intrinsic viscosity $\eta_i$ of the degraded starches is in general in the range from 0.02 to 0.06 dl/g. The intrinsic viscosity $\eta_i$ is determined according to DIN EN1628 at a temperature of 23° C.

The amounts of degraded starch which are used in the emulsion polymerization are preferably from 20 to 50 parts by weight, in particular from 30 to 45 parts by weight, based on 100 parts by weight of the monomers to be polymerized.

The invention also relates to a process for the preparation of aqueous polymer dispersions based on copolymers of vinyl aromatics and conjugated aliphatic dienes by copolymerization of the monomers in an aqueous medium in the presence of a degraded starch and of free radical initiators, wherein
(a) from 19.9 to 80 parts by weight of at least one vinyl aromatic compound,
(b) from 19.9 to 80 parts by weight of at least one conjugated aliphatic diene,
(c) from 0.1 to 10 parts by weight of at least one ethylenically unsaturated acid and
(d) from 0 to 20 parts by weight of at least one other monoethylenically unsaturated monomer,
the sum of the parts by weight of the monomers (a), (b), (c) and (d) always being 100, are used in the free radical emulsion copolymerization, a degraded starch having an intrinsic viscosity $\eta_i$ of less than 0.07 dl/g is used and at least 0.9% by weight, based on the monomers used altogether, of initiators selected from peroxodisulfates, peroxosulfates, azo initiators, organic peroxides, organic hydroperoxides and hydrogen peroxide is used, at least 30% by weight of the initiators being initially taken together with the degraded starch in the aqueous medium and the monomers and the remaining initiators being metered into this initially taken mixture under polymerization conditions.

In a preferred embodiment of the process according to the invention, from 3 to 10% by weight of the monomers to be polymerized altogether are initially taken together with the aqueous solution or dispersion of the degraded starch and at least 30% by weight of the initiator in the aqueous medium. The remaining monomers and the remaining initiators are then metered into this initially taken mixture at the start of the polymerization under polymerization conditions, but separately from one another. In general, a degraded native starch having an intrinsic viscosity of from 0.02 to 0.06 dl/g is used in the emulsion polymerization. Polymerization conditions are to be understood as meaning that the reaction mixture has been heated in the vessel to the required temperature at which the polymerization takes place. These temperatures are, for example, from 80 to 130° C., preferably from 90 to 120° C. The polymerization is preferably carried out under pressure, e.g. at pressures up to 15 bar, in general from 2 to 10 bar.

Preferably,
(a) from 19.9 to 80 parts by weight of styrene and/or methylstyrene,
(b) from 19.9 to 80 parts by weight of 1,3-butadiene and/or isoprene,
(c) from 0.1 to 10 parts by weight of at least one ethylenically unsaturated acid and
(d) from 0 to 20 parts by weight of at least one other monoethylenically unsaturated monomer, the sum of the parts by weight of the monomers (a), (b), (c) and (d) always being 100,
are used in the emulsion copolymerization.

In general, the monomer mixtures used in the emulsion copolymerization comprises
(a) from 25 to 70 parts by weight of styrene and/or methylstyrene,
(b) from 25 to 70 parts by weight of 1,3-butadiene and/or isoprene,
(c) from 0.1 to 10 parts by weight of at least one ethylenically unsaturated acid and
(d) from 0 to 20 parts by weight of at least one other monoethylenically unsaturated monomer,
the sum of the parts by weight of the monomers (a), (b), (c) and (d) always being 100.

Acrylic acid, methacrylic acid, itaconic acid, maleic acid, crotonic acid, vinylsulfonic acid, acrylamidomethylpropanesulfonic acid, vinylphosphonic acid, alkali metal or ammonium salts of these acids and mixtures of the acids and/or salts are preferably used as component (c) of the monomer mixtures in the emulsion copolymerization. However, the acids can also be used in partly neutralized form.

In the process according to the invention, at least 0.9% by weight, based on the monomers to be polymerized altogether, of at least one initiator from the group consisting of the peroxodisulfates, peroxosulfates, azo initiators, organic peroxides, organic hydroperoxides and hydrogen peroxide is used, at least 30% by weight of the initiators being initially taken together with the degraded starch in the aqueous medium and the monomers and the remaining initiators being metered into this initially taken mixture under polymerization conditions. Preferably, water-soluble initiators are used, e.g. sodium persulfate, potassium persulfate, ammonium persulfate, sodium peroxodisulfate, potassium peroxodisulfate and/or ammonium peroxodisulfate.

Examples of further suitable initiators are dibenzoyl peroxide, tert-butyl perpivalate, tert-butyl per-2-ethylhexanoate, di-tert-butyl peroxide, diamyl peroxide, dioctanoyl peroxide, didecanoyl peroxide, dilauroyl peroxide, bis(o-toluoyl) peroxide, succinyl peroxide, tert-butyl peracetate, tert-butyl permaleate, tert-butyl perisobutyrate, tert-butyl perpivalate, tert-butyl peroctoate, tert-butyl perbenzoate, tert-butyl hydroperoxide, hydrogen peroxide, azobisisobutyronitrile, 2,2'-azobis(2-methylbutyronitrile), 2,2'-azobis(2,4-dimethylvaleronitrile), 2,2'-azobis(N,N'-dimethyleneisobutyroamidine) dihydrochloride and azobis(2-amidinopropane) dihydrochloride. The initiators are used, for example, in amounts of up to 2.0% by weight, based on the monomers to be polymerized. In general, initiators are used in amounts of from 1.0 to 1.5% by weight, based on the monomers.

In order to prepare the polymer dispersions according to the invention, an aqueous solution of the degraded starches described above and at least 30% by weight of the amount of initiator required altogether are initially taken, for example, in a heatable reactor which is equipped with a mixing apparatus. The amount of initiator in the initially taken mixture is not more than 90% by weight, in general not more than 60% by weight, of the amount required altogether for the polymerization of the monomers. The degraded starch produces good dispersing of the monomers and stabilization of the resulting finely divided polymers. In the emulsion polymerization at least partial grafting of the degraded starch takes place, which starch is thereby firmly incorporated into the polymer forming.

In order to promote the dispersing of the monomers in the aqueous medium, the protective colloids and/or emulsifiers usually used as dispersants can be used. A detailed description of suitable protective colloids is to be found in Houben-Weyl, Methoden der organischen Chemie, volume XIV/1, Makromolekulare Stoffe, Georg-Thieme-Verlag, Stuttgart, 1961, pages 411 to 420. Suitable emulsifiers are surface-active substances whose molar mass $M_w$ is in general below 2000, while the molar mass $M_w$ of the protective colloids may be up to 50 000.

Suitable emulsifiers are, for example, ethoxylated $C_8$- to $C_{36}$-fatty alcohols having a degree of ethoxylation of from 3 to 50, ethoxylated mono-, di- and tri-$C_4$- to $C_{12}$-alkylphenols having a degree of ethoxylation of from 3 to 50, alkali metal salts of dialkyl esters of sulfosuccinic acid, alkali metal and ammonium salts of $C_8$- to $C_{12}$-alkyl sulfates, alkali metal and ammonium salts of $C_{12}$- to $C_{18}$-alkylsulfonic acids and alkali metal and ammonium salts of $C_9$- to $C_{18}$-alkylarylsulfonic acids. If emulsifiers and/or protective colloids are concomitantly used as assistants for dispersing the monomers, the amounts used thereof are, for example, from 0.1 to 5% by weight, based on the monomers.

The initially taken mixture may also comprise a polystyrene seed, i.e. an aqueous dispersion of finely divided polystyrene having a particle diameter of from 20 to 40 nm.

In order to modify the properties of the polymers, the emulsion polymerization can, if appropriate, be carried out in the presence of at least one polymerization regulator. Examples of polymerization regulators are organic compounds which comprise sulfur in bound form, such as dodecyl mercaptan, thiodiglycol, ethylthioethanol, di-n-butyl sulfide, di-n-octyl sulfide, diphenyl sulfide, diisopropyl disulfide, 2-mercaptoethanol, 1,3-mercaptopropanol, 3-mercaptopropane-1,2-diol, 1,4-mercaptobutanol, thioglycolic acid, 3-mercaptopropionic acid, mercaptosuccinic acid, thioacetic acid and thiourea. Further polymerization regulators are aldehydes, such as formaldehyde, acetaldehyde and propionaldehyde, organic acids, such as formic acid, sodium formate or ammonium formate, alcohols, such as, in particular, isopropanol, and phosphorus compounds, such as sodium hypophosphite. If a regulator is used in the polymerization, the amount used in each case is, for example, from 0.01 to 5, preferably from 0.1 to 1, % by weight, based on the monomers used in the polymerization. The regulators are preferably metered into the initially taken mixture together with the monomers. However, they may also be partially or completely present in the initially taken mixture.

The emulsion polymerization is effected in an aqueous medium. This may be, for example, completely demineralized water or mixtures of water and a solvent miscible therewith, such as methanol, ethanol or tetrahydrofuran. In order to polymerize the monomers, an aqueous solution of the degraded starch is first prepared. This solution may comprise, if appropriate, protective colloid and/or an emulsifier in dissolved form and, if appropriate, a polystyrene seed. The aqueous solution used as the initially taken mixture is preferably heated to the temperature at which the polymerization of the monomers is to take place or to a temperature which is, for example, from 5 to 20° C. below the polymerization temperature, before at least 30% of the amount of initiator required altogether is added to the initially taken mixture. As soon as the respectively desired polymerization temperature is reached or within a time span of from 1 to 15 minutes, preferably from 5 to 15 minutes, after reaching the polymerization temperature, the metering of the monomers is started. They can be pumped into the reactor, for example, continuously in the course of, for example, from 60 minutes to 10 hours, in general in the course of from 2 to 4 hours. Stepwise addition of the monomers is also possible.

In a preferred embodiment of the process according to the invention, from 3 to 10% by weight of the monomers to be polymerized altogether are initially taken in the reactor together with the abovementioned constituents and the reactor content is then heated to polymerization temperature, at least 30% by weight of the amount of initiator preferably being added shortly before reaching the polymerization temperature, as described above, and the remaining monomers then being metered as stated above. After the end of polymerization, if appropriate, further initiator can be added to the reaction mixture and a postpolymerization carried out at the same temperature or a lower or higher temperature as in the case of the main polymerization. In order to complete the polymerization reaction, it is sufficient in most cases to stir the reaction mixture, for example, for from 1 to 3 hours at the polymerization temperature after addition of all monomers.

The pH may be, for example, from 1 to 5 during the polymerization. After the polymerization, the pH is adjusted, for example, to a value of from 6 to 7. Virtually coagulum-free aqueous dispersions are obtained. The amount of coagulum is in the ppm range and is, as shown in the examples, from 8 to 25 ppm.

An aqueous polymer dispersion whose dispersed particles have a mean particle diameter from 80 to 150 nm is obtained. The mean particle diameter of the polymer particles was determined by dynamic light scattering on a 0.005 to 0.01% by weight aqueous polymer dispersion at 23° C. with the aid of an Autosizer IIC from Malvern Instruments, England. The data are based in each case on the mean diameter of the cumulant evaluation (cumulant z-average) of the measured autocorrelation function according to ISO standard 13321.

In an embodiment, the solids content of the aqueous polymer dispersion according to the invention is more than 55% by weight, for example at least 60% by weight. A correspondingly high solids content can be achieved, for example, by corresponding adjustment of the amount of water used in the emulsion polymerization and/or the amounts of monomers.

In an embodiment, the emulsion copolymerization is effected in the absence of an emulsifier and/or without use of polymer seed.

The aqueous polymer dispersions according to the invention are used as binder, adhesive, sizer for fibers or for the production of coverings. They are preferably used as binders in paper coating slips. Paper coating slips usually comprise at least one pigment which is dispersed in water and an organic binder, e.g. a polymer dispersion based on a carboxylated styrene-acrylate copolymer (Acronal® S 728 from BASF Aktiengesellschaft, Ludwigshafen). For example, from 5 to 25 parts by weight of an organic binder are used per 100 parts by weight of an inorganic pigment. Papers which have been coated with paper coating slips which comprise the aqueous polymer dispersions according to the invention as binders have a very high pick resistance. The dispersions according to the invention impart a higher binding power to the paper coating slips than the most closely compatible known polymer dispersions, cf. comparative example 1.

The aqueous polymer dispersions according to the invention can also be used as sizers. They are suitable both for the sizing of the textile fibers and for the sizing of mineral fibers, in particular glass fibers. Owing to their good adhesive power, they can also be used as an adhesive and for the production of coverings.

EXAMPLES

Unless evident otherwise from the context, the data in percent are always percent by weight.

The solids contents were determined by drying a defined amount of the respective aqueous copolymer dispersion (about 5 g) at 140° C. in a drying oven to constant weight. In each case two separate measurements were carried out. The values stated in the examples are mean values of these two measured results.

The determination of the glass transition temperature was effected according to DIN 53765 by means of a DSC820 apparatus, series TA8000, from Mettler-Toledo Int. Inc.

The amount of coagulum in the dispersion relates to particles whose diameter is >45 μm. It was determined by filtering the finished dispersion through a sieve having a known pore diameter.

The mean particle diameters of the polymer particles were determined by dynamic light scattering on a 0.005 to 0.01% strength by weight aqueous polymer dispersion at 23° C. by means of an Autosizer IIC from Malvern Instruments, England. The mean diameter of the cumulant evaluation (cumulant z-average) of the measured autocorrelation function (ISO standard 13321) is stated.

The intrinsic viscosity $\eta_i$ was determined according to DIN EN 1628 at a temperature of 23° C.

In the examples, the following starting materials were used:

Emulsifier A: aryl sulfonate (Disponil® LDPS 20 from Cognis)

Degraded starch A: commercially available 67% strength aqueous maltodextrin having an intrinsic viscosity $\eta_i$ of 0.052 dl/g Example 1

710 g of demineralized water, 41 g of a 33% strength by weight aqueous polystyrene seed (particle size 30 nm), 16 parts by weight of emulsifier A and 806 g of the degraded starch A were initially taken at room temperature and under a nitrogen atmosphere in a 6 l pressure-resistant reactor equipped with an MIG stirrer and 3 metering apparatuses. The reactor content was then heated to 90° C. with stirring (180 rpm). As soon as a temperature of 85° C. was reached, 129 g of a 7% strength by weight aqueous sodium persulfate solution were added. After 10 minutes, beginning at the same time, the total amount of feed 1A and feed 1B were metered in continuously in the course of 360 minutes and feed 2 in the course of 390 minutes, at constant flow rates. The flows of feed 1A and feed 1B were homogenized over the total metering time shortly before entry into the reactor. Thereafter, the reactor content was allowed to continue reacting for a further 2 hours at 90° C. Thereafter, the reactor content was cooled to room temperature, a pH of 6.5 was established with a 15% strength by weight aqueous NaOH and the pressure-resistant container was let down to atmospheric pressure. The coagulum formed was separated off from the dispersion by filtration over a sieve (neck size 100 microns).

Feed 1A
Homogeneous Mixture

| | |
|---|---|
| 664 g | of demineralized water |
| 12 g | of 15% strength by weight aqueous sodium dodecyl sulfate solution |
| 72 g | of acrylic acid |
| 9 g | of itaconic acid |

Feed 1B
Homogeneous Mixture

| | |
|---|---|
| 1026 g | of styrene |
| 21 g | of tert-dodecyl mercaptan |
| 793 g | of butadiene |

Feed 2

| |
|---|
| 360 g of a 3.5% strength by weight aqueous sodium persulfate solution |

The aqueous dispersion (D1) obtained had a solids content of 52% by weight, based on the total weight of the aqueous dispersion, and comprised 23 ppm of coagulum. The glass transition temperature of the polymer was determined as 10° C. and the particle size as 141 nm.

Example 2

712 g of demineralized water, 41 g of 33% strength by weight aqueous polystyrene seed (particle size 30 nm, with 16 parts by weight of emulsifier Disponil® LDPS 20 from Cognis) and 806 g of a 67% strength by weight maltodextrin (Roclys C1967S, Roquette) and in each case 5% by weight of the feeds 1A and 1B were initially taken at room temperature and under a nitrogen atmosphere in a 6 l pressure-resistant reactor equipped with an MIG stirrer and 3 metering apparatuses. Thereafter, the reactor content was heated to 90° C. with stirring (180 rpm) and, on reaching 85° C., 128 g of a 7% strength by weight aqueous sodium persulfate solution were added. After 10 minutes, beginning at the same time, the total amount of feed 1A and feed 1B were metered in continuously in the course of 360 minutes, and feed 2 in the course of 390 minutes, at constant flow rates. The flows of feed 1A and feed 1B were homogenized over the total metering time shortly before entry into the reactor. Thereafter, the reactor content was allowed to continue reacting for a further 2 hours at 90° C. Thereafter, the reactor content was cooled to room temperature, a pH of 6.5 was established with a 15% strength by weight aqueous NaOH and the pressure-resistant container was let down to atmospheric pressure.

Feed 1A
Homogeneous Mixture

| | |
|---|---|
| 664 g | of demineralized water |
| 12 g | of a 15% strength by weight aqueous sodium dodecyl sulfate solution |
| 72 g | of acrylic acid |
| 9 g | of itaconic acid |

Feed 1B
Homogeneous Mixture

| | |
|---|---|
| 1026 g | of styrene |
| 22 g | of tert-dodecyl mercaptan |
| 793 g | of butadiene |

Feed 2

| |
|---|
| 360 g of a 3.5% strength by weight aqueous sodium persulfate solution |

The aqueous dispersion (D2) obtained had a solids content of 51% by weight, based on the total weight of the aqueous dispersion, and comprised 13 ppm of coagulum. The glass transition temperature was determined at 11° C. and the particle size as 126 nm.

Example 3

712 g of demineralized water, 806 g of the degraded starch A and in each case 5% by weight of the feeds 1A and 1B were initially taken at room temperature and under a nitrogen atmosphere in a 6 l pressure-resistant reactor equipped with an MIG stirrer and 3 metering apparatuses. Thereafter, the reactor content was heated to 90° C. with stirring (180 rpm) and, on reaching 85° C., 129 g of a 7% strength by weight aqueous sodium persulfate solution were added. After 10 minutes, beginning at the same time, the total amount of feed 1A and feed 1B were metered in continuously in the course of 360 minutes, and feed 2 in the course of 390 minutes, at constant flow rates. The flows of feed 1A and feed 1B were homogenized over the total metering time shortly before entry into the reactor. Thereafter, the reactor content was allowed to continue reacting for a further 2 hours at 90° C. Thereafter, the reactor content was cooled to room temperature, a pH of 6.5 was established with a 15% strength by weight aqueous NaOH and the pressure-resistant container was let down to atmospheric pressure.

Feed 1A
Homogeneous Mixture

| | |
|---|---|
| 671 g | of demineralized water |
| 12 g | of a 15% strength by weight aqueous sodium dodecyl sulfate solution |
| 72 g | of acrylic acid |
| 9 g | of itaconic acid |

Feed 1B
Homogeneous Mixture

| | |
|---|---|
| 1026 g | of styrene |
| 21 g | of tert-dodecyl mercaptan |
| 693 g | of butadiene |

Feed 2

| | |
|---|---|
| 360 g | of a 3.5% strength by weight aqueous sodium persulfate solution |

The aqueous dispersion (D3) obtained had a solids content of 52% by weight, based on the total weight of the aqueous dispersion, and comprised 21 ppm of coagulum. The glass transition temperature was determined at 10° C. and the particle size as 127 nm.

Example 4

710 g of demineralized water, 42 g of 33% strength by weight aqueous polystyrene seed (particle size 30 nm, with 16 parts by weight of emulsifier Disponil® LDPS 20 from Cognis) and 806 g of a 67% strength by weight maltodextrin (Roclys C1967S, Roquette) were initially taken at room temperature and under a nitrogen atmosphere in a 6 l pressure-resistant reactor equipped with an MIG stirrer and 3 metering apparatuses. Thereafter, the reactor content was heated to 90° C. with stirring (180 rpm) and, on reaching 85° C., 77 g of a 7% strength by weight aqueous sodium persulfate solution were added. After 10 minutes, beginning at the same time, the total amount of feed 1A and feed 1B were metered in continuously in the course of 360 minutes, and feed 2 in the course of 390 minutes, at constant flow rates. The flows of feed 1A and feed 1B were homogenized over the total metering time shortly before entry into the reactor. Thereafter, the reactor content was allowed to continue reacting for a further 2 hours at 90° C. Thereafter, the reactor content was cooled to room temperature, a pH of 6.5 was established with a 15% strength by weight NaOH and the pressure-resistant container was let down to atmospheric pressure.

Feed 1A
Homogeneous Mixture

| | |
|---|---|
| 710 g | of demineralized water |
| 12 g | of a 15% strength by weight aqueous sodium dodecyl sulfate solution |
| 72 g | of acrylic acid |
| 9 g | of itaconic acid |

Feed 1B
Homogeneous Mixture

| | |
|---|---|
| 1026 g | of styrene |
| 22 g | of tert-dodecyl mercaptan |
| 693 g | of butadiene |

Feed 2

| | |
|---|---|
| 360 g | of a 3.5% strength by weight aqueous sodium persulfate solution |

The aqueous dispersion (D4) obtained had a solids content of 50% by weight, based on the total weight of the aqueous dispersion, and comprised 10 ppm of coagulum. The glass transition temperature was determined at 9° C. and the particle size as 145 nm.

Example 5

643 g of demineralized water, 537 g of the degraded starch A and in each case 5% by weight of the feeds 1A and 1B were initially taken at room temperature and under a nitrogen atmosphere in a 6 l pressure-resistant reactor equipped with an MIG stirrer and 3 metering apparatuses. Thereafter, the reactor content was heated to 90° C. with stirring (180 rpm) and, on reaching 85° C., 129 g of a 7% strength by weight aqueous sodium persulfate solution were added. After 10 minutes, beginning at the same time, the remaining amount (in each case 95%) of feed 1A and feed 1B were metered in continuously in the course of 360 minutes, and feed 2 in the course of 390 minutes, at constant flow rates. The flows of feed 1A and feed 1B were homogenized over the total metering time shortly before entry into the reactor. Thereafter, the reactor content was allowed to continue reacting for a further 2 hours at 90° C. Thereafter, the reactor content was cooled to room temperature, a pH of 6.5 was established with a 15% strength by weight aqueous NaOH and the pressure-resistant container was let down to atmospheric pressure.

Feed 1A
Homogeneous Mixture

| | |
|---|---|
| 642 g | of demineralized water |
| 12 g | of a 15% strength by weight aqueous sodium dodecyl sulfate solution |
| 72 g | of acrylic acid |
| 9 g | of itaconic acid |

Feed 1B
Homogeneous Mixture

| | |
|---|---|
| 1026 g | of styrene |
| 22 g | of tert-dodecyl mercaptan |
| 693 g | of butadiene |

Feed 2

| | |
|---|---|
| 360 g | of a 3.5% strength by weight aqueous sodium persulfate solution |

The aqueous dispersion (D5) obtained had a solids content of 51% by weight, based on the total weight of the aqueous dispersion, and comprised 8 ppm of coagulum. The glass transition temperature was determined at 10° C. and the particle size as 137 nm.

Comparative example 1 analogous to example 6 of WO-A-99/09251

Degraded starch B: hydroxyethyl-starch, degraded according to the data in WO 99/09251, solids content: 38.2% by weight.

Polymerization 2030 g of the degraded starch B were initially taken at room temperature and under a nitrogen atmosphere in a 6 l pressure-resistant reactor equipped with an MIG stirrer and 3 metering apparatuses. The reactor content was then heated to 90° C. with stirring (180 rpm). On reaching a temperature of about 90° C., 5 g of a 3.5% strength by weight aqueous sodium persulfate solution were added. After 5 minutes, beginning at the same time, feed 1 and feed 2 were metered in continuously in the course of 480 minutes at constant flow rates. The flows were homogenized over the total metering time shortly before entry into the reactor. Thereafter, the reactor content was allowed to continue reacting for a further hour at 90° C. Thereafter, the reactor content was cooled to room temperature, a pH of 6.2 was established with a 15% strength by weight aqueous NaOH and the pressure-resistant container was let down to atmospheric pressure.

Feed 1
Homogeneous Mixture

| 484 g | of styrene |
|---|---|
| 342 g | of butadiene |

Feed 2

| 170 g | of a 3.5% strength aqueous sodium persulfate solution |
|---|---|

The aqueous dispersion (CD1) obtained had a solids content of 49% by weight, based on the total weight of the aqueous dispersion, and comprised 500 ppm of coagulum. The glass transition temperature was determined at 8° C. and the particle size as 138 nm.

Example 6

564 g of demineralized water and 895 g of the degraded starch A were initially taken at room temperature and under a nitrogen atmosphere in a 6 l pressure-resistant reactor equipped with an MIG stirrer and 3 metering apparatuses. Thereafter, the reactor content was heated to 90° C. with stirring (180 rpm), and, on reaching 85° C., 143 g of a 7% strength by weight aqueous sodium persulfate solution were added. Thereafter, beginning at the same time, the total amount of feed 1A and feed 1B were metered in continuously in the course of 360 minutes, and feed 2 in the course of 390 minutes, at constant flow rates. The flows of feed 1A and feed 1B were homogenized over the total metering time shortly before entry into the reactor. Thereafter, the reactor content was allowed to continue reacting for a further 2 hours at 90° C. Thereafter, the reactor content was cooled to room temperature, a pH of 6.5 was established with a 15% strength by weight NaOH and the pressure-resistant container was let down to atmospheric pressure.

Feed 1A, homogeneous mixture of

| 450 g | of demineralized water |
|---|---|
| 8 g | of a 15% strength by weight aqueous sodium dodecylsulfate solution |
| 60 g | of acrylic acid |
| 20 g | of itaconic acid |

Feed 1B, homogeneous mixture of

| 1140 g | of styrene |
|---|---|
| 24 g | of tert-dodecyl mercaptan |
| 780 g | of butadiene |

Feed 2

| 142 g | of a 7% strength by weight aqueous sodium persulfate solution |
|---|---|

The aqueous dispersion (D6) obtained had a solids content of 60% by weight, based on the total weight of the aqueous dispersion, and comprised 18 ppm of coagulum. The glass transition temperature was determined as 6° C. and the particle size as 140 nm.

Example 7

643 g of demineralized water and 761 g of the degraded starch A were initially taken at room temperature and under a nitrogen atmosphere in a 6 l pressure-resistant reactor equipped with an MIG stirrer and 3 metering apparatuses. Thereafter, the reactor content was heated to 90° C. with stirring (180 rpm), and, on reaching 85° C., 122 g of a 7% strength by weight aqueous sodium persulfate solution were added. Thereafter, beginning at the same time, the total amount of feed 1A and feed 1B were metered in continuously in the course of 360 minutes, and feed 2 in the course of 390 minutes, at constant flow rates. The flows of feed 1A and feed 1B were homogenized over the total metering time shortly before entry into the reactor. Thereafter, the reactor content was allowed to continue reacting for a further 2 hours at 90° C. Thereafter, the reactor content was cooled to room temperature, a pH of 6.5 was established with a 15% strength by weight NaOH and the pressure-resistant container was let down to atmospheric pressure.

Feed 1A
homogeneous mixture of

| 976 g | of demineralized water |
|---|---|
| 51 g | of acrylic acid |
| 17 g | of itaconic acid |

Feed 1B
homogeneous mixture of

| 969 g | of styrene |
|---|---|
| 15 g | of tert-dodecyl mercaptan |
| 663 g | of butadiene |

Feed 2

| 122 g | of a 7% strength by weight aqueous sodium persulfate solution |
|---|---|

The aqueous dispersion (D7) obtained had a solids content of 50% by weight, based on the total weight of the aqueous dispersion, and comprised 7 ppm of coagulum. The glass transition temperature was determined as 7° C. and the particle size as 138 nm.

The aqueous polymer dispersions prepared according to examples 1 to 5 and comparative example 1 were used as binders for paper coating slips.
Preparation of the Paper Coating Slips:
Coating Slip Preparation The preparation of the coating slip was effected in a stirring unit (Deliteur) into which the individual components were fed in succession. The pigments were added in predispersed form (slurry).

Further components were added after the pigments, the sequence corresponding to the sequence in the stated coating slip formulation.

The final solids content was established by the addition of water.
Coating on the Pilot Plant The coating slips described above were applied to an uncoated wood-free base paper on the BASF pilot coating plant. The following experimental parameters were chosen:

| | |
|---|---|
| Coating slip formulation: | 70 parts of finely divided carbonate |
| | 30 parts of finely divided clay |
| | 10 parts of coating slip binder |
| | 0.5 part of rheology assistant (CMC) |
| Coating slip data: | solids content 66% |
| | viscosity low shear (Brookfield RVT, spindle 4, 100 rpm) |
| | 1200-1500 mPas |
| | viscosity high shear |
| | (Thermo-Haake RS 600) |
| | cf. table |
| Application method: | blade coating method |

Determination of the contact pressure of the blade over the contact pressure distance in mm
cf. table

| | |
|---|---|
| Base paper: | wood-free, 70 g/m$^2$ |
| Amount applied: | 10 g/m$^2$ to each of both sides |
| Drying: | by means of hot air and IR radiators to 4.5% residual moisture |

The coated papers were then calendered (90° C., 300 m/min, 200 kn/m nip pressure) and cut to the suitable printing press size for a subsequent sheet-fed offset printing experiment.
Determination of the Number of Pick Particles (Particle/cm$^2$)

The papers were printed on using a special test print setup on a 4-color sheet-fed offset printing press (KCL pick print test). In this case, the number of particles picked out of the paper surface and deposited on a rubber blanket is used as a measure of the offset resistance of the papers. The particles are counted out visually. The smaller the number of particles, the more suitable is the paper for offset printing.
Offset Test (Laboratory Test)

Samples having a size of 240×46 mm were cut in the longitudinal direction from the papers to be tested. An appropriate amount of printing ink was added to the inking roll and left to run for 1 minute. A printing disk was then inserted and inked for 30 s.

The printing speed was 1 m/s. A paper strip was brought back to the starting position on a printing test support with the printed paper strip. After a specified time span, the printing process was started again without replacing the printing disk. This process was repeated several times.

After each printing cycle, the pick on the printed side of the paper strip was assessed visually. The table states the number of cycles before picking occurred for the first time. The higher the number of cycles up to the occurrence of picking, the more suitable are the papers for offset printing.
Determination of the Viscosity of Paper Coating Slips at High Shear The viscosity of the paper coating slips was measured in a Haake viscometer at a shear gradient of 100 000/s and a temperature of 23° C. The viscosity is stated in mPa·s.

The table states the viscosity of the paper coating slips at high shear, the doctor blade pressure of the pilot machine in mm contact pressure distance and the binding power, which was characterized with the aid of the offset cycles and the number of pick particles/cm$^2$.

TABLE

| Dispersion | Viscosity at high shear [mPa · s] | Doctor blade pressure in mm contact pressure distance | Offset cycles | Printing press particles/cm$^2$ |
|---|---|---|---|---|
| D1 | 26 | 7 | 5 | 4 |
| D2 | 24 | 7 | 5 | 8 |
| D3 | 25 | 6.8 | 5 | 10 |
| D4 | 25 | 7 | 5 | 7 |
| D5 | 25 | 6.7 | 5 | 7 |
| D6 | 26 | 7 | 5 | 6 |
| D7 | 25 | 6.9 | 5 | 4 |
| CD1 | not measurable | 7 | 1 | 2000 |

The invention claimed is:

1. An aqueous polymer dispersion based on copolymers of vinyl aromatics and conjugated aliphatic dienes, wherein said polymer dispersions have a mean particle size of from 80 to 150 nm and are obtained by free radical emulsion copolymerization of
    (a) from 19.9 to 80 parts by weight of at least one vinyl aromatic compound,
    (b) from 19.9 to 80 parts by weight of at least one conjugated aliphatic diene,
    (c) from 0.1 to 10 parts by weight of at least one ethylenically unsaturated acid and
    (d) from 0 to 20 parts by weight of at least one other monoethylenically unsaturated monomer,
    the sum of the parts by weight of the monomers (a), (b), (c) and (d) always being 100,
    in an aqueous medium in the presence of at least one degraded starch having an intrinsic viscosity $\eta_i$ of less than 0.07 dl/g with the use of at least 0.9% by weight, based on the monomers used altogether, of initiators selected from peroxodisulfates, peroxosulfates, azo initiators, organic peroxides, organic hydroperoxides and hydrogen peroxide, at least 30% by weight of the initiators being initially taken together with the degraded starch in the aqueous medium and the monomers and the remaining initiators being metered into this initially taken mixture under polymerization conditions.

2. The aqueous polymer dispersion according to claim 1, which is obtained by free radical emulsion copolymerization, from 3 to 10% by weight of the monomers to be polymerized altogether being initially taken in the aqueous medium.

3. The aqueous polymer dispersion according to claim 1, wherein a degraded native starch having an intrinsic viscosity $\eta_i$ of from 0.02 to 0.06 dl/g is used in the emulsion copolymerization.

4. The aqueous polymer dispersion according to claim 1, wherein (a) from 19.9 to 80 parts by weight of styrene and/or methylstyrene,
(b) from 19.9 to 80 parts by weight of 1,3-butadiene and/or isoprene,
(c) from 0.1 to 10 parts by weight of at least one ethylenically unsaturated acid and
(d) from 0 to 20 parts by weight of at least one other monoethylenically unsaturated monomer,
the sum of the parts by weight of monomers (a), (b), (c) and (d) always being 100,
are used in the emulsion copolymerization.

5. The aqueous polymer dispersion according to claim 1, wherein
(a) from 25 to 70 parts by weight of styrene and/or methylstyrene,
(b) from 25 to 70 parts by weight of 1,3-butadiene and/or isoprene,
(c) from 0.1 to 10 parts by weight of at least one ethylenically unsaturated acid and
(d) from 0 to 20 parts by weight of at least one other monoethylenically unsaturated monomer,
the sum of the parts by weight of the monomers (a), (b), (c) and (d) always being 100,
are used in the emulsion copolymerization.

6. The aqueous polymer dispersion according to claim 1, wherein from 15 to 60 parts by weight of a degraded starch are used per 100 parts by weight of the monomers in the emulsion copolymerization.

7. The aqueous polymer dispersion according to claim 1, wherein the solids content is greater than 55% by weight.

8. The aqueous polymer dispersion according to claim 1, wherein the emulsion copolymerization is effected in the absence of an emulsifier and/or without use of polymer seed.

9. A process for the preparation of aqueous polymer dispersions based on copolymers of vinyl aromatics and conjugated aliphatic dienes by copolymerization of the monomers in an aqueous medium in the presence of a degraded starch and of free radical initiators, wherein
(a) from 19.9 to 80 parts by weight of at least one vinyl aromatic compound,
(b) from 19.9 to 80 parts by weight of at least one conjugated aliphatic diene,
(c) from 0.1 to 10 parts by weight of at least one ethylenically unsaturated acid and
(d) from 0 to 20 parts by weight of at least one other monoethylenically unsaturated monomer,
the sum of the parts by weight of the monomers (a), (b), (c) and (d) always being 100,
are used in the free radical emulsion copolymerization, a degraded starch having an intrinsic viscosity $\eta_i$ of less than 0.07 dl/g is used and at least 0.9% by weight, based on the monomers used altogether, of initiators selected from peroxodisulfates, peroxosulfates, azo initiators, organic peroxides, organic hydroperoxides and hydrogen peroxide is used, at least 30% by weight of the initiators initially being taken together with the degraded starch in the aqueous medium and the monomers and the remaining initiators being metered into this initially taken mixture under polymerization conditions.

10. The process according to claim 9, wherein from 3 to 10% by weight of the monomers to be polymerized altogether are initially taken in the aqueous medium.

11. The process according to claim 9, wherein a degraded native starch having an intrinsic viscosity $\eta_i$ of from 0.02 to 0.06 dl/g is used in the emulsion copolymerization.

12. The process according to claim 9, wherein
(a) from 19.9 to 80 parts by weight of styrene and/or methylstyrene,
(b) from 19.9 to 80 parts by weight of 1,3-butadiene and/or isoprene,
(c) from 0.1 to 10 parts by weight of at least one ethylenically unsaturated acid and
(d) from 0 to 20 parts by weight of at least one other monoethylenically unsaturated monomer,
the sum of the parts by weight of the monomers (a), (b), (c) and (d) always being 100, are used in the emulsion copolymerization.

13. The process according to claim 9, wherein
(a) from 25 to 70 parts by weight of styrene and/or methylstyrene,
(b) from 25 to 70 parts by weight of 1,3-butadiene and/or isoprene,
(c) from 0.1 to 10 parts by weight of at least one ethylenically unsaturated acid and
(d) from 0 to 20 parts by weight of at least one other monoethylenically unsaturated monomer,
the sum of the parts by weight of the monomers (a), (b), (c) and (d) always being 100,
are used in the emulsion copolymerization.

14. The process according to claim 9, wherein acrylic acid, methacrylic acid, itaconic acid, maleic acid, crotonic acid, vinylsulfonic acid, acrylamidomethylpropanesulfonic acid, vinylphosphonic acid, alkali metal or ammonium salts of these acids and mixtures of the acids and/or salts are used as component (c) in the monomer mixtures in the emulsion copolymerization.

15. The process according to claim 9, wherein from 15 to 60 parts by weight of a degraded starch are used per 100 parts by weight of the monomers in the emulsion copolymerization.

16. The process according to claim 9, wherein sodium persulfate, potassium persulfate, ammonium persulfate, sodium peroxodisulfate, potassium peroxodisulfate and/or ammonium peroxodisulfate is used as initiator.

17. The process according to claim 9, wherein the emulsion copolymerization is effected in the absence of an emulsifier and/or without use of polymer seed.

18. A binder, adhesive, size for fibers or for the production of coverings comprising the aqueous polymer dispersion according to claim 1.

* * * * *